United States Patent
Trygg

(10) Patent No.: US 8,070,201 B2
(45) Date of Patent: Dec. 6, 2011

(54) PACKAGING UNIT HANDLING ARRANGEMENT

(76) Inventor: Lars Erik Trygg, Karhlshamn (SE)

( * ) Notice: Subject to any disclaimer, the term of this patent is extended or adjusted under 35 U.S.C. 154(b) by 640 days.

(21) Appl. No.: 12/095,090

(22) PCT Filed: Nov. 27, 2006

(86) PCT No.: PCT/SE2006/001338
§ 371 (c)(1),
(2), (4) Date: Sep. 4, 2008

(87) PCT Pub. No.: WO2007/061363
PCT Pub. Date: May 31, 2007

(65) Prior Publication Data
US 2008/0310947 A1    Dec. 18, 2008

(30) Foreign Application Priority Data
Nov. 28, 2005    (SE) ...................................... 0502593

(51) Int. Cl.
*B25J 13/08*    (2006.01)
(52) U.S. Cl. ......... 294/87.1; 294/86.4; 294/907; 901/49
(58) Field of Classification Search ................. 294/86.4, 294/86.41, 87.1, 65, 67.5, 907; 901/45, 46, 901/49
See application file for complete search history.

(56) References Cited

U.S. PATENT DOCUMENTS

| | | | | |
|---|---|---|---|---|
| 4,720,923 A * | 1/1988 | Quinton et al. | ................. | 33/644 |
| 4,778,329 A * | 10/1988 | Phillips | ......................... | 414/589 |
| 4,872,718 A * | 10/1989 | Nerger | ......................... | 294/86.4 |
| 4,915,574 A * | 4/1990 | Park et al. | ..................... | 414/680 |
| 4,960,298 A * | 10/1990 | Moroi | ........................... | 294/64.1 |
| 5,116,190 A * | 5/1992 | Silke | ............................. | 414/735 |
| 5,352,086 A * | 10/1994 | Mank | ............................ | 414/797 |
| 6,082,080 A | 7/2000 | Holter et al. | | |

(Continued)

FOREIGN PATENT DOCUMENTS
DE    3620391 A1    12/1987
(Continued)

OTHER PUBLICATIONS
International Bureau Notification Concerning Transmittal of International Preliminary Report on Patentability (Chapter I of the Patent Cooperation Treaty) Jun. 12, 2008.

(Continued)

*Primary Examiner* — Dean Kramer
(74) *Attorney, Agent, or Firm* — Holland & Hart LLP

(57) ABSTRACT

An arrangement for handling packaging units, such as bottles, crates and the like with the aid of a robot, wherein the arrangement includes a mounting part (10) which is adapted for fixation to a robot arm, a tool carrier (20) which is adapted to carry one or more handling tools (30) such as a number of bottle grippers or the like, and a number of couplings each comprising a first engagement member (13) affixed to the mounting part, and a second engagement member (24) affixed to the tool carrier, wherein the second engagement member is restrictively displaceable axially relative to the first engagement member, so that the second engagement member will take a latching position relative to the first engagement member under the effect of gravity on the tool carrier in engagement with the first engagement member, wherein the working state of the tool carrier relative to the mounting part is defined when all second engagement members are in their respective latching positions.

8 Claims, 3 Drawing Sheets

U.S. PATENT DOCUMENTS 6,473,985 B2 * 11/2002 Won et al. ........................ 33/644

FOREIGN PATENT DOCUMENTS

| DE | 9208980 | U1 | 11/1993 |
| DE | 10007386 | A1 | 9/2001 |
| DE | 10240696 | A1 | 3/2004 |
| DE | 202004007938 | U1 | 10/2005 |
| EP | 1 132 182 | A1 | 2/2001 |
| GB | 2216493 | A | 10/1989 |

OTHER PUBLICATIONS

Extended European Search Report dated Dec. 7, 2009.

* cited by examiner

PACKAGING UNIT HANDLING ARRANGEMENT

FIELD OF THE INVENTION

The present invention relates to an arrangement for handling packaging units, such as bottles, crates and the like with the aid of a robot in accordance with the preamble of claim 1.

BACKGROUND OF THE INVENTION

A very large number of bottles, crates, pans, boxes, and corresponding packaging units are handled daily in breweries for instance. Such handling may include the simultaneous lifting of a large number of bottles from a supply table and then lowering the bottles into a plurality of crates positioned in a matrix formation. This transfer of bottles from the table to the crates into which they are placed relative to one another may also require the configuration of the bottles to be changed during the lifting process. The handling process may also include lifting empty returnable bottles from crates and also moving and stacking crates.

Because the production capacity and bottle-filling capacity of breweries has increased considerably in recent times, greater demands have also been placed on the capacity and reliability of the equipment responsible for handling empty and full bottles, crates and other packaging units.

Consequently, robots have begun to be used for handling purposes to an ever increasing extent. Stationary multiple-axle industrial robots have found wide use in handling processes. The robot, or manipulator, is normally placed in a so-called robot cell in which it is able to carry out several different lifting, positioning and configuring operations. In order to enable the robot to handle different types of bottles, crates and the like it is provided with different tools, such as grippers, it being necessary to change these tools when the work to be carried out by the robot changes. A tool will normally include a large number of package engaging members with which a corresponding number of packaging units can be moved simultaneously by movement of the robot arm.

In the case of modern robot-assisted handling of packaging units very high demands are placed on the number of packaging units that can be handled at any one time and also on the speed at which each batch can be moved. High demands are also placed on the precision with which the packaging units can be moved and positioned.

In order to enable a high continuous production rate to be maintained, it is also highly essential that the handling equipment functions reliably and that any interruptions in operation that may occur, for instance as a result of defective packaging units, can be kept as short as possible.

DESCRIPTION OF PRIOR ART TECHNOLOGY

An earlier known arrangement for handling packaging units includes a mounting part and a tool carrier. The mounting part is designed to enable it to be affixed to a robot arm with the aid of pneumatic grippers provided on the robot arm. The tool carrier carries grippers or the like which are adapted to grip the packaging units to be handled in the handling operation for which the arrangement is intended.

The tool holder is connected to the mounting part by means of four relatively short shafts that project out from an upper part of the tool carrier and which typically have a length of about 50 mm. Conical latching members are provided at the free ends of respective shafts. The latching members engage in corresponding conical seats affixed to the mounting part, wherein the shafts extend down through lower openings in the seats. The tool carrier thus hangs down from the mounting part and takes its working position when all latching members are in engagement with respective seats. A conical helical spring is disposed around each shaft which urges the tool carrier in a direction away from the mounting part so that respective latching members are pressed into engagement with their respective seats. A sensor is provided at each latching member so as to indicate whether or not the latching member has been brought out of its engagement with the seat.

Thus, the tool carrier hangs beneath the mounting part in normal use, wherewith the weight of the tool carrier in combination with the spring forces keeps the latching members affixed in their seats. In the event of large accelerations and retardations of the robot arm, the springs ensure that the inertia of the larger mass of the tool carrier and its load will not cause the tool carrier to be positioned obliquely relative to the mounting part such as to prevent the latching members from being out of engagement with respective seats. To ensure that this retaining effect will be achieved in the case of heavy loads and large accelerations or retardations, the springs used must be relatively rigid.

When handling packages in the manner described above, there is a danger that the intended movement of the tool carrier will be obstructed. This obstruction may consist of a bottle or some foreign object which has unintentionally been left in a crate that is to be filled, or may consist of a deformed or wrongly positioned packaging unit, or of a foreign object present in the movement path of the tool carrier. In the case of the known arrangement described above, the tool carrier will be positioned somewhat obliquely in relation to the mounting part should the tool carrier collide with an obstacle. One or more of the latching members will then be brought out of engagement with their respective seat. Such an event is indicated by the sensor, which accordingly sends a signal to the robot controlled system which, in response to the signal, stops further movement of the robot arm. Due to delay in the robot control system and also due to the inertia in a loaded robot arm, movement of the robot arm can not be stopped immediately and the arm will continue to move to some extent after the sensor has detected oblique positioning of the tool carrier. Due to the design of the springs the force with which the latching members are pressed against the seats by the springs will increase with increasing inclination of the tool carrier or its displacement relative to the mounting part. The relatively short shafts also set a low maximum limit to the extent to which the tool carrier can be inclined or displaced relative to the mounting part before these two parts come into rigid abutment with one another.

The arrangement described above thus only results in a relatively slight resilient coupling between the mounting part and the tool carrier. This can cause serious damage to the robot, the tool carrier, the mounting part or the foreign object with which the tool carrier collides during said continued movement after one or more sensors has/have detected that the latching member has been moved out of engagement with its seating.

The arrangement described above also has drawbacks with regard to securing and interchanging tools. Because the tool carrier can not be easily released from the mounting part, due to the fact that the shafts with their latching members are located in the lower circular openings of the seats, it is necessary for both tool carrier and mounting part to be replaced in order to enable a quick tool change to be achieved. Consequently, each tool carrier must be equipped with an own mounting part, which is both expensive and space demanding.

Because the mounting part is held to the robot arm by means of pneumatic grippers there is a danger of the mounting part with said tool carrier loosening from the robot arm when the arm is in a lifting mode. This can happen, for instance, as a result of wrong manoeuvring, wrong programming, in service work or as a result of malfunctioning of the pneumatic equipment. Any loosening of the mounting part with the tool carrier will, of course, result in serious damage, not only on these parts but also injury to and damage of peripheral personnel and equipment.

SUMMARY OF THE INVENTION

Accordingly, one object of the invention is to provide a package unit handling arrangement that will provide safe movement of packaging units at high speeds and which reduces the risk of damage to equipment and injury to personnel in the event of the tool carrier colliding with a foreign object.

Another object of the invention is to provide such an arrangement with which safe securement of the tool carrier can be ensured.

A further object of the invention is to provide such an arrangement with which tool changes can be made quickly, safely and readily.

These and other objects are achieved with an arrangement of the kind defined in the preamble of claim 1 and which comprises the special technical features set forth in the characterizing clause of the claim.

As a result of the adjustable spring arrangement it is possible to press the engagement members into engagement with one another with two mutually different tensioning forces. For instance, it is possible to apply a low tensioning force during said relatively slow movement in regions where the danger of colliding with foreign objects exists. The coupling between the tool carrier and mounting part will herewith have a high degree of resilience, so that the tool carrier can be allowed to slope or be displaced relative to the mounting part. The risk of damage to the arrangement, to the robot, and peripheral and equipment or injury to personnel is herewith minimized in the event of a clash with a foreign object. Such slow movement under low tensioning forces is performed, for instance, suitably in and in the neighbourhood of those regions where the tools shall pick-up or place a packaging unit.

Since the arrangement shall be moved at high speeds, with or without carrying packaging units, in free areas where the risk of colliding with foreign objects is slight or non-existent, the spring arrangement is adapted so as to allow a high tensioning force to be applied to the engagement members. This enables the robot arm to be greatly accelerated and retarded without the inertia caused by the weight of the tool carrier and the load resulting in inclination of the tool carrier relative to the mounting part.

The arrangement according to the invention thus provides safe movement with a small risk of damage in critical regions and extremely rapid movement in safe regions.

Moreover, an arrangement which is constructed in accordance with claim 5 enables a tool change to be carried out extremely quickly, simply and safely. In the case of the claim 5 embodiment, the tool carrier can be released from the mounting part by moving the mounting part and the tool carrier towards one another. Because such release can only be achieved when the tool carrier is supported stably against a supportive surface a release of the tool carrier cannot be achieved when the tool carrier hangs freely in space. The danger of the tool carrier falling down and injuring personnel in the vicinity of the carrier or damaging peripheral equipment whilst making a tool change is therewith greatly reduced. This construction also enables one and the same mounting part to be used with several mutually different tool carriers, wherewith said mounting part is capable of being affixed securely to the robot arm, for instance with the aid of screw joints. A tool carrier exchange can also be carried out very quickly and simply, by first allowing the robot to lower the tool carrier onto a fixed support surface and then turning the mounting part out of engagement with the tool carrier, and thereafter moving the mounting part down towards the next tool carrier and turning the mounting part into engagement therewith.

Further objects of the invention and advantages afforded thereby will be apparent from the following detailed description of the invention and from the accompanying claims.

BRIEF DESCRIPTION OF THE DRAWINGS

An exemplifying embodiment of the invention will now be described in detail with reference to the figures of the accompanying drawings, in which.

DETAILED DESCRIPTION OF AN EMBODIMENT ACCORDING TO THE INVENTION

Figure 1:
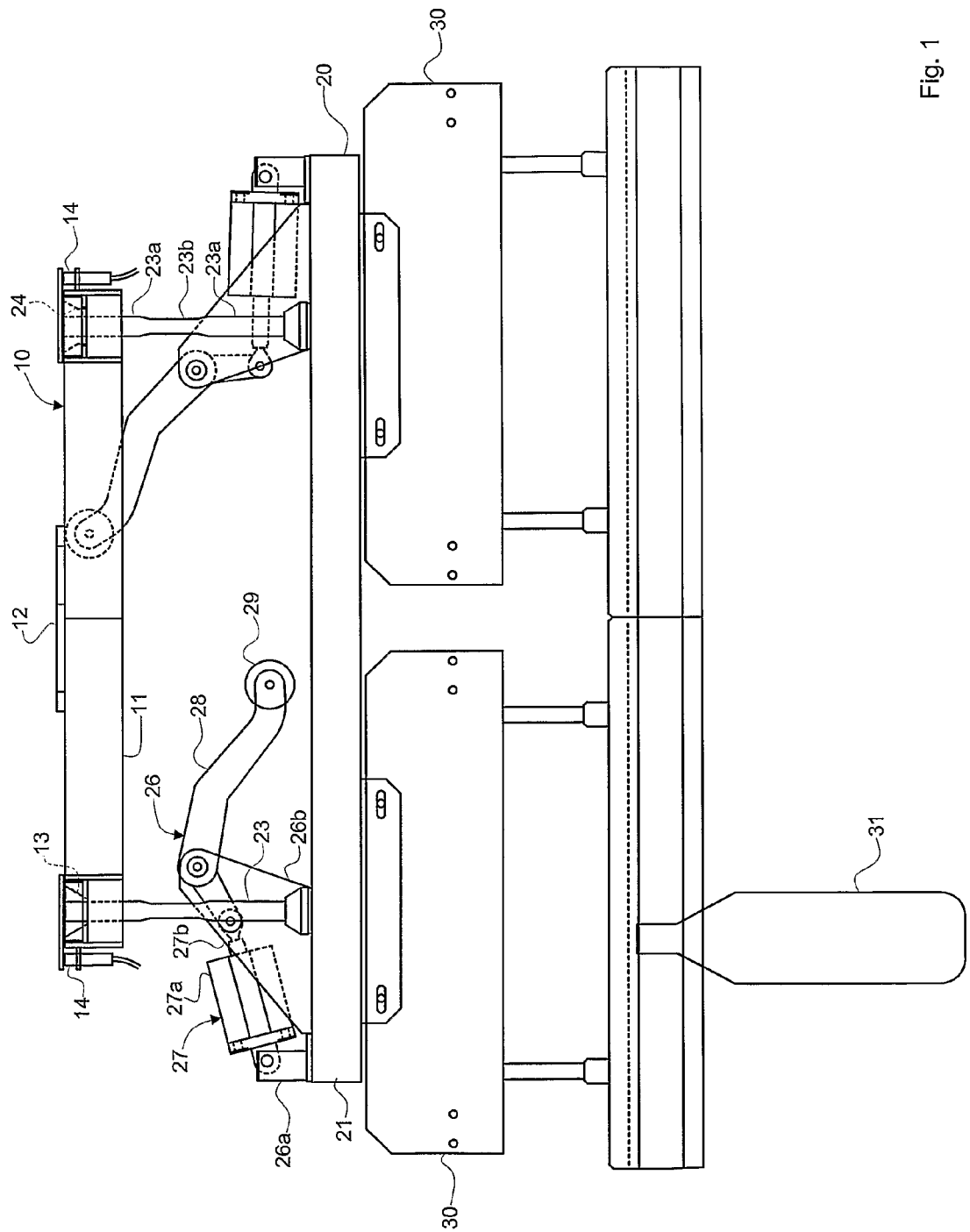
FIG. 1 is a plan view from one side of an arrangement according to the invention.
Figure 2:
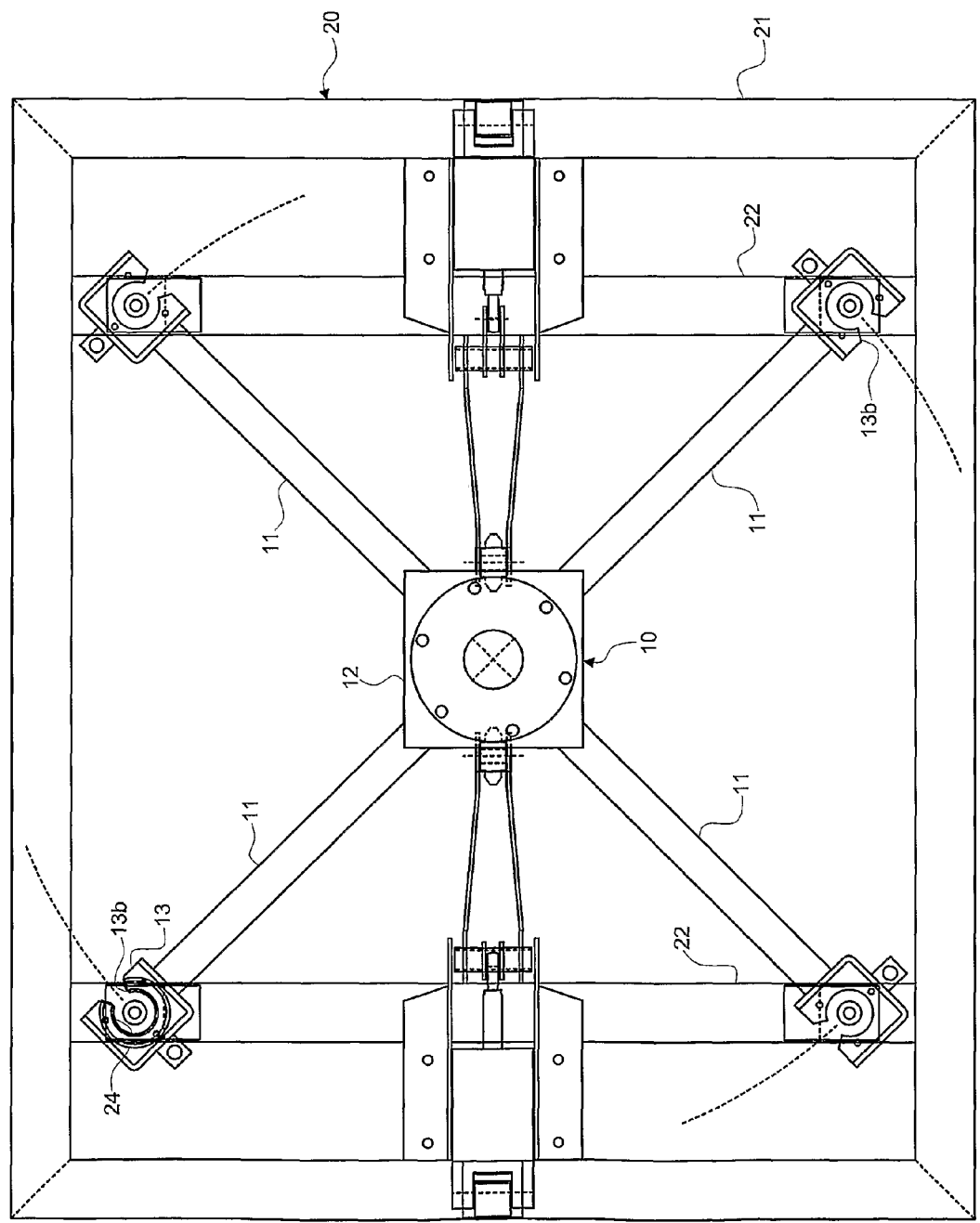
FIG. 2 is a plan view from above the arrangement shown in FIG. 1.
Figure 3:
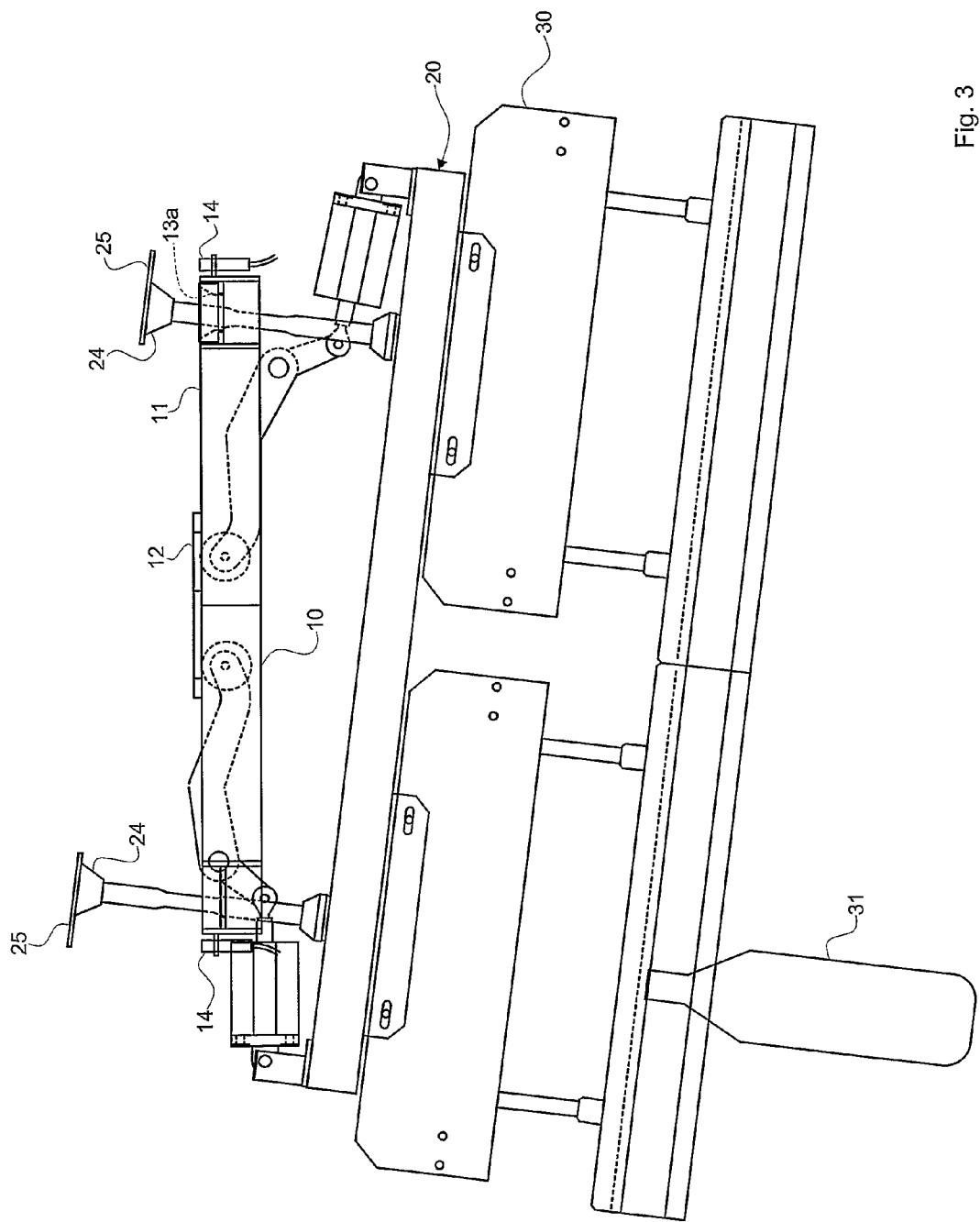
FIG. 3 is a plan view from the side corresponding to that according to FIG. 1, and shows the arrangement with the tool carrier in an oblique position.

The arrangement shown in FIGS. 1-3 includes a mounting part 10 and a tool carrier 20 on which a number of grippers 30 are affixed for co-action with bottles 31.

The mounting part 10 includes four beams or bars 11 which are welded to one another in the form of a cross. A mounting plate 12 is affixed to the beams at the centre of the cross. The mounting plate 12 includes a number of mounting holes with which the mounting part can be affixed to a robot arm, for instance with the aid of bolt joints (not shown). There is affixed at the outer end of each beam 11 a first engagement member. Each first engagement member is comprised of a downwardly tapering funnel-shaped seating 13 which has an inwardly facing, conical engagement surface 13a (FIG. 3). Each seat 13 is open upwardly and downwardly and also includes a radially through-penetrating slot 13b that extends along the full length of the seat. A detector in the form of a sensor 14 is provided by the side of each seat 13. Signal conductors are connected from the sensors 14 to the robot control unit. The tool carrier 20 comprises a generally square framework 21 of mutually welded beams or arms. Two transverse beams 22 extend parallel with one another between a first pair of opposing side beams in the framework 21, at a small distance inwardly from a respective adjacent beam in the second pair of mutually opposing side beams in the framework 21. A trunnion 23 is affixed to the transverse beams in the vicinity of each end of said beams 22. The trunnions 23 project out upwardly at right angles from respective transverse beams 22. The centre distances of the trunnions 23 to one another corresponds very precisely to the centre distance between the seats 13 of the mounting part 10. A conical latching member 24 is affixed, concentrically with respective trunnions 23. In the case of the illustrated embodiment, the trunnions have a length of about 300 mm, although this length may vary between about 200-400 mm in the case of other embodiments. The end-portions 23a of respective trunnions 23 have a cross-sectional diameter that is slightly smaller than the lower circular openings of the seats 13, so as to enable the trunnions 23 to be moved axially relative to the seats 13. The trunnions 23 include between the two end portions 23a thereof a reduced portion 23b whose diameter is slightly smaller than the width of the slot 13b in the peripheral direction of the seats, so as to enable these reduced portions to be moved radially out of and into the seats 13 through the slots 13b.

An indicator tab 25 is affixed at each latching member 24 so as to project laterally from the latching member and into contact with the sensor 14 when the conical surface of the latching member lies against the corresponding conical surface 13b of a respective seat 13.

Two mutually opposing spring arrangements are affixed to the framework 21 and to transverse beams 21 through the medium of brackets 26a, 26b. Each spring arrangement 26 includes an air spring 27 and a link arm 28 which carries a contact roller 29 at one end of the arm. The air spring 27 is affixed to the bracket 26a such as to be pivotal about a horizontal axis. The air spring includes an air cylinder 27a and an internal piston (not shown) which is connected to a piston rod 27b that extends through the end wall of the air cylinder 27a opposite to the bracket 26a. The pressure on the opposite side of the piston in relation to the piston rod 27b in the air cylinder 27a can be adjusted pneumatically with the aid of a conduit (not shown) connected to this side of the cylinder.

The link arm 28 is connected to the end of the piston rod 27b projecting out from the air spring 27 at the end opposite to the pressure roller 29. The link arm 28 is also affixed to the bracket 26b at both ends so as to enable the arm to rotate about a horizontal axis.

As will be best evident from a comparison between the different positions or states of the spring arrangement 26 shown respectively to the left and to the right of FIG. 1, the force generated by the spring arrangement at the pressure roller 29 will decrease the more the pressure roller is pressed downwards in relation to the framework 21 from the highest position shown to the right in the figure. When the pressure roller is in its highest position, the lever arm with which the air spring 27 rotates the link arm 28 about its rotational axis has a maximum length. This lever arm, on the other hand, has a much shorter length when in the position shown to the left of the figure. The geometrical configuration of the spring arrangement 28 thus produces a decreasing force when the link arm is pressed in a direction towards the force developed by the spring arrangement.

There now follows a description of the use of the inventive arrangement.

When the mounting part 10 is affixed to the robot arm and the tool carrier 20 is fitted so that all latching members 24 are in engagement with their respective seats 13, a low pressure can be applied, for instances in the air cylinder 27. This low pressure is sufficient to lift both link arms 28 to the position shown to the right in FIG. 1, in which the pressure rollers are in abutment with the underside of the mounting plate 12. On the other hand, this pressure is so low that the rollers will not exert any appreciable force against the mounting plate. The tool carrier 20 thus hangs below the mounting part 10 and the engagement of the latching member 24 with the seats 13 is retained solely by the effect of gravity on the tool carrier. The indicator tabs 25 lie against the sensors 14, which send to the robot control unit signals to the effect that the tool carrier 20 has taken a correct working position. The robot arm can now be moved relatively slowly in regions in which there exists a risk that the tool carrier or the load supported thereby collides with an obstacle, such as a bottle that has been left by mistake in an otherwise empty crate.

If the tool carrier 20 or the load comes into contact with an obstacle, the tool carrier 20 will be positioned obliquely or lifted relative to the mounting part 10. This will result in one or more contact tags 25 being removed from respective sensors 14, wherewith there will be sent to the robot control unit a signal to the effect that the tool carrier has been moved out of its correct position. The control unit then orders movement of the robot arm to be stopped. Because of a given unavoidable time delay in the control system, and due to the inertia of the loaded robot arm, the robot arm will, however, continue to move through a certain distance subsequent to the indicator tag 25 having been removed from the sensor 14. Because of the small force with which the pressure rollers 29 lie against the mounting plate together with the fact that this force will also decrease with increased inclination of the tool carrier, the tool carrier is now allowed to be inclined still further during continued movement of the robot arm. This greatly reduces the danger of one of the following pieces of equipment, the tool carrier 20, the robot arm, the motors included in the robot, the foreign object with which the tool carrier has come into contact or any other piece of equipment, being damaged during this continued movement. The relatively long length of the trunnions in combination with a corresponding large diameter of the conical surfaces of the seats also contributes in allowing significant inclination of the tool carrier in relation to the mounting part 10.

When the robot arm shall be moved at high speeds in safe areas where the risk of collision with a foreign object is small or non existent, the first spring arrangement is re-adjusted so that the pressure roll 29 will lie against the mounting plate 12 with a large abutment force. This readjustment is achieved simply by applying a comparatively high pressure in the air cylinder 27b. Adjustment between the low and high pressure is conveniently controlled automatically by the robot control program. It is also preferable to include a latching function which will allow the arm to be controlled manually only if the spring arrangement is in its low-force-state.

When the spring arrangement is in its high-pressure-mode, the tool carrier 20 is pressed with a large force in a direction away from the mounting part 10, wherewith the latching members 24 are pressed into abutment with the conical surfaces 13a of the seats. In this state of the arrangement, the robot arm can be moved at high speed and high acceleration and retardation without danger of the tool carrier being obliquely positioned as a result of its moment of inertia. Should the tool carrier 20 move into collision with a foreign object with the spring arrangement in its high-pressure mode, any damage that occurs will be reduced as a result of the decreasing force exerted by the spring arrangements in the event of inclination of the tool carrier.

A tool change is carried out by first moving the robot arm so to place the tool carrier 20 on a flat and stable support surface. The robot arm and the mounting part 10 are then lowered so that the tapering parts 23b of respective trunnions 23 are located opposite the slots 13b in the seat 13. The mounting part 10 is then rotated by the robot about its vertical centre axis, such that the trunnions 23 will be moved out of its seat 13 through the slots 13b. The same mounting part 10 can then be moved to another tool carrier, which is then coupled to the mounting part by means of a corresponding coupling operation.

The inventive arrangement thus enables a tool change to be made in a very simple, rapid and positive fashion. The fact that the mounting part is affixed to the robot arm and the fact that gravity causes and sustains engagement of the latching member with the seats eliminates all or greatly reduces the risk of the mounting part or the tool carrier being loosened unintentionally from the robot arm.

Although the present invention has been described with reference to a particular embodiment by way of example, it will be understood that the invention is not restricted to this particular embodiment and that variations can be made freely within the scope of the accompanying claims.

The invention claimed is:

1. An arrangement for handling packaging units with the aid of a robot, wherein the arrangement comprises:
   a mounting part which is adapted for fixation to a robot arm,
   a tool carrier which is adapted to carry one or more handling tools,
   and a number of couplings each of which includes a first engagement member affixed to the mounting part, and a second engagement member affixed to the tool carrier wherein the second engagement member is restrictively movable axially in relation to the first engagement member such that under the force of gravity acting on the tool carrier, the second engagement member in engagement with the first engagement member, will adopt a latching position relative to the first engagement member, wherein the working position of the tool carrier relative to the mounting part is defined when all second engagement members are in their latching positions, wherein the arrangement further comprises a spring which is adapted to apply a separating force between the mounting part and the tool carrier such as to press the second engagement members in a direction towards their latching positions in engagement with the first engagement member, wherein the spring is selected from the group of springs consisting of an air spring or a liquid spring and the spring further comprises a piston that is movable in a pressure cylinder, such that two different pressures can be applied to one side of the piston for adjustment of the spring between two mutually different modes corresponding to two mutually different magnitudes of said separating force, and that the spring further comprises a link arm which is pivotally mounted to the tool carrier and one end of which is coupled to the piston and the other end of which can lie in abutment with the mounting part, the link arm being configured geometrically for reducing the force with which the spring acts on the mounting part when the tool carrier is at least one of inclined relative to the mounting part or displaced in a direction towards said mounting part.

2. An arrangement according to claim 1, wherein the spring is affixed to the tool carrier.

3. An arrangement according to claim 1 wherein the couplings are adapted to allow the tool carrier to be released from the mounting part by rotating the mounting part relative to the tool carrier when all first engagement members and second engagement members have been moved out of engagement with one another by displacing the mounting part and the tool carrier in a direction towards one another.

4. An arrangement according to claim 3, wherein the first engagement members include a seat that has an internal conical engagement surface and a radial slot and the second engagement members include a latching member that has a corresponding outer conical engagement surface, wherein the latching member is disposed on a trunnion which projects out from the tool carrier and which includes a reduced portion at a location between the latching member and the tool carrier, so as to allow the reduced portion to be moved radially out of and into the seat through said slot.

5. An arrangement according to claim 4, wherein each trunnion has a length of about 200-400 mm so as to allow inclination of the tool carrier relative to the mounting part.

6. An arrangement according to claim 5, wherein the length is about 250-300 mm.

7. An arrangement according to claim 1, wherein the arrangement includes sensors for detecting whether or not any of the second engagement members have lost their engagement with a respective first engagement member.

8. An arrangement according to claim 1, wherein the one or more handling tools comprises a number of bottle grippers.

* * * * *